(12) United States Patent
Park et al.

(10) Patent No.: US 10,910,968 B2
(45) Date of Patent: Feb. 2, 2021

(54) MOTOR DRIVE DEVICE AND MOTOR DRIVE SYSTEM

(71) Applicant: KOREA ELECTRONICS TECHNOLOGY INSTITUTE, Seongnam-si (KR)

(72) Inventors: Joonsung Park, Seoul (KR); Junhyuk Choi, Bucheon-si (KR); Jinhong Kim, Suwon-si (KR); Byongjo Hyon, Anyang-si (KR); Yongsu Noh, Bucheon-si (KR); Dongmyoung Joo, Bucheon-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 16/451,192

(22) Filed: Jun. 25, 2019

(65) Prior Publication Data
US 2020/0007056 A1 Jan. 2, 2020

(30) Foreign Application Priority Data
Jun. 28, 2018 (KR) .......................... 10-2018-0074588

(51) Int. Cl.
*H03K 5/00* (2006.01)
*H02P 6/182* (2016.01)
*H02P 6/10* (2006.01)

(52) U.S. Cl.
CPC ............... *H02P 6/182* (2013.01); *H02P 6/10* (2013.01)

(58) Field of Classification Search
CPC .............................. H02P 6/182; H02P 6/10
USPC ..................................................... 318/400.13
See application file for complete search history.

(56) References Cited

U.S. PATENT DOCUMENTS

| | | | |
|---|---|---|---|
| 6,388,416 B1* | 5/2002 | Nakatani ................ | H02P 6/085 318/700 |
| 6,534,938 B1* | 3/2003 | Wu ........................ | H02P 6/182 318/400.28 |
| 9,917,539 B1* | 3/2018 | Omura ...................... | H02P 6/16 |
| 2014/0062358 A1* | 3/2014 | Reynolds ................ | H02P 6/182 318/400.06 |
| 2017/0346420 A1* | 11/2017 | Ross ....................... | H02P 6/182 |
| 2018/0183368 A1* | 6/2018 | Murakami .............. | H02P 6/182 |

FOREIGN PATENT DOCUMENTS

KR 10-0189122 B1 6/1999

* cited by examiner

*Primary Examiner* — Erick D Glass
(74) *Attorney, Agent, or Firm* — Hauptman Ham, LLP (57) ABSTRACT

The present disclosure provides a motor drive device and a motor drive system for improving a control stability despite an imbalance in zero crossing points in a sensorless motor of which position of a rotor is estimated by a counter electromotive force. The motor drive device includes: a position detector configured to detect a rotational position of a rotor of a motor by detecting a plurality of zero crossing points of a counter electromotive force induced in the motor; and a controller configured to control the motor by estimating a phase change timing based on a time interval between a current zero crossing point and a previous zero crossing point of a same state as the current zero crossing point among the plurality of zero crossing points detected by the position detector.

6 Claims, 6 Drawing Sheets

MOTOR DRIVE DEVICE AND MOTOR DRIVE SYSTEM

CROSS-REFERENCE TO RELATED APPLICATION

The present application claims priority to Korean Patent Application No. 10-2018-0074588, filed on Jun. 28, 2018, in the Korean Intellectual Property Office, which is incorporated herein in its entirety by reference.

TECHNICAL FIELD

The present disclosure relates to a motor drive device and, more particularly, to a motor drive device for improving a control stability despite an imbalance in zero crossing points in a sensorless motor of which position of a rotor is estimated by a counter electromotive force. Additionally, the present disclosure relates to a motor drive system employing the motor drive device.

BACKGROUND

In recent years, brushless direct current (BLDC) motors controlled by inverters are increasingly used in household appliances such as an air conditioner, a washing machine, and a refrigerator in order to increase an energy efficiency.

The BLDC motor does not include a brush unlike a direct current (DC) motor, and thus a maintenance due to a wear of the brush is not required. If an ideal square-wave current is applied to stator windings in synchronicity with a position of a rotor, the BLDC motor can generate a constant torque similarly to the DC motor.

Therefore, the BLDC motor is increasingly used in a robot that requires small-sized motors or drivers, and is widening its usage to a hybrid or electric vehicle.

In driving the BLDC motor, it is required to check a position of the rotor to alternately provide phase voltages. In one method of checking the position of the rotor, the position of the rotor is estimated by using a counter electromotive force. That is, a phase change timing may be determined based on a zero crossing point (ZCP) of the counter electromotive force. Korean patent publication No. 10-0189122 issued Jan. 14, 1999, and entitled SENSORLESS BLDC MOTOR CONTROL METHOD is an evidence of this.

However, in case that the motor reveals an asymmetric counter electromotive force or an offset exists in the counter electromotive force, an imbalance is introduced in the time intervals between the zero crossing points, i.e. the zero crossing points does not occur at uniform time intervals, which increases current ripples and torque ripples and lowers a control stability.

SUMMARY

Provided are a motor drive device and a motor drive system for improving a control stability despite an imbalance in zero crossing points in a sensorless motor of which position of a rotor is estimated by a counter electromotive force.

Additional aspects will be set forth in part in the description which follows and, in part, will be apparent from the description, or may be learned by practice of the presented exemplary embodiments.

According to an aspect of an exemplary embodiment, a motor drive device includes: a position detector configured to detect a rotational position of a rotor of a motor by detecting a plurality of zero crossing points of a counter electromotive force induced in the motor; and a controller configured to control the motor by estimating a phase change timing based on a time interval between a current zero crossing point and a previous zero crossing point of a same state as the current zero crossing point among the plurality of zero crossing points detected by the position detector.

The controller may determine a rising or falling state of the counter electromotive force at an instant at which the current zero crossing point T0 is detected and estimate the phase change timing based on the time interval between the current zero crossing point and the previous zero crossing point of the same state as the current zero crossing point.

The controller may estimate the phase change timing according to equation 2:

$$t_{trans} = \frac{T(n-1)}{2} \quad (2)$$

Here, T(n−1) denotes a time interval between the previous zero crossing point T2 having a same rising and falling state as the current zero crossing point T0 detected recently and the next zero crossing point T1 of the previous zero crossing point T2.

The controller may determine a lead angle from a waveform of the counter electromotive force detected by the position detector and estimate the phase change timing by additionally taking into account the lead angle.

The controller may calculate a lead angle time according to equation 4:

$$t_{adv} = \frac{x°}{120°}\{T(n) + T(n-1)\} \quad (4)$$

Here, x denotes the lead angle, and T(n) denotes a time interval between the current zero crossing point T0 and a prior previous zero crossing point T1 occurred just before.

The controller may estimate the phase change timing by taking into account the lead angle according to equation 5:

$$t_{trans(adv)} = \frac{T(n-1)}{2} + \frac{x°}{120°}\{T(n) + T(n-1)\} \quad (5)$$

According to an aspect of another exemplary embodiment, a motor drive system includes: a motor configured to generate a torque and comprising a rotor; a position detector configured to detect a rotational position of the rotor of the motor by detecting a plurality of zero crossing points of a counter electromotive force induced in the motor; and a controller configured to control the motor by estimating a phase change timing based on a time interval between a current zero crossing point and a previous zero crossing point of a same state as the current zero crossing point among the plurality of zero crossing points detected by the position detector.

The motor drive device according to the present disclosure controls a sensorless motor by detecting a plurality of zero crossing points by a position detector and estimating a phase change timing based on a time interval between a current zero crossing point and a previous zero crossing point of a same state as the current zero crossing point. Thus, the present disclosure reduces the current ripples and torque ripples and improves the control stability for the motor despite the imbalance in the zero crossing points Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

In the following description and the accompanied drawings, only parts necessary for understanding embodiments of the present disclosure will be described, and the descriptions of well-known functions or configurations that may obscure the subject matter of the present disclosure will be omitted for simplicity.

The terms and words used in the following description and appended claims are not necessarily to be construed in an ordinary sense or a dictionary meaning, and may be appropriately defined herein to be used as terms for describing the present disclosure in the best way possible. Such terms and words should be construed as meaning and concept consistent with the technical idea of the present disclosure. The embodiments described in this specification and the configurations shown in the drawings are merely preferred embodiments of the present disclosure and are not intended to limit the technical idea of the present disclosure. Therefore, it should be understood that there may exist various equivalents and modifications which may substitute the exemplary embodiments at the time of filing of the present application.

For a more clear understanding of the features and advantages of the present disclosure, the present disclosure will be described in detail with reference to the accompanied drawings.

Figure 1:
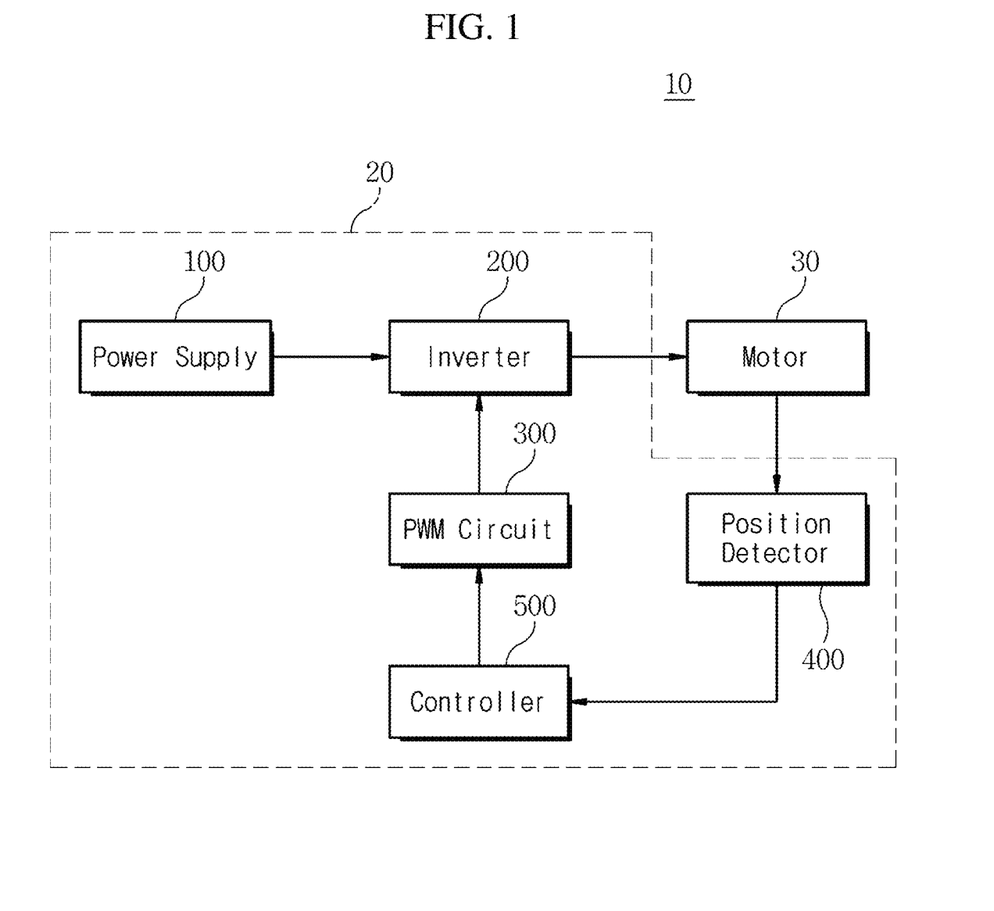
FIG. 1 is a block diagram of a motor drive system according to an exemplary embodiment of the present disclosure.
Figure 2:
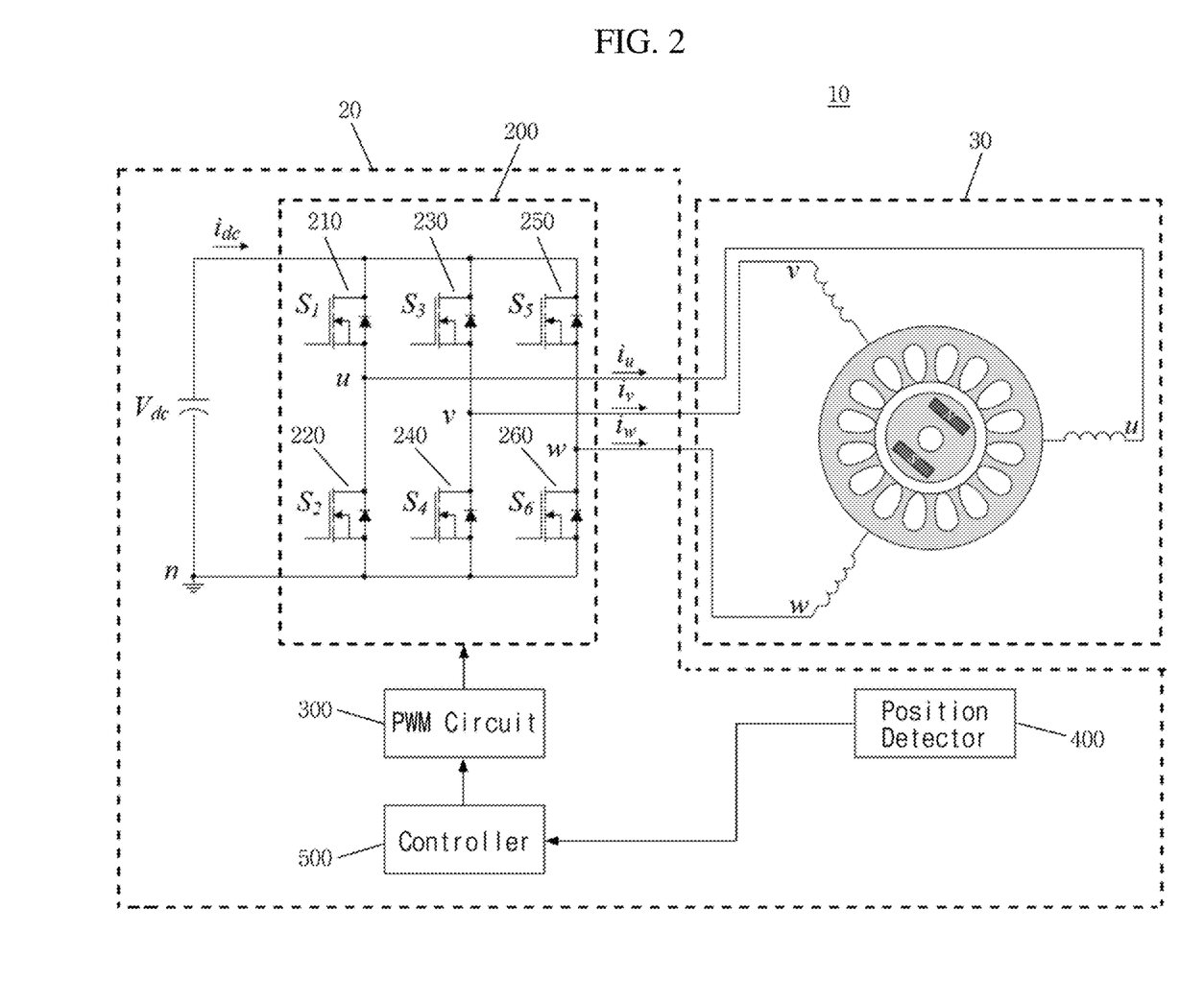
FIG. 2 is a schematic circuit diagram of the motor drive system according to an exemplary embodiment of the present disclosure.

FIG. 1 is a block diagram of a motor drive system according to an exemplary embodiment of the present disclosure, and FIG. 2 is a schematic circuit diagram of the motor drive system according to an exemplary embodiment of the present disclosure.

The motor drive system 10 for enhancing a control stability of the motor 30 can be implemented by simply changing a configuration of a conventional motor drive device. Thus, the motor drive system 10 is applicable with little additional cost. This motor drive system 10 includes a motor drive device 20 and a motor 30.

The motor drive device 20 includes a power supply 100, an inverter 200, a pulse width modulation (PWM) circuit 300, a position detector 400, and a controller 500.

The power supply 100 has one terminal connected to the inverter 200 to supply voltage and current to the inverter 200 and the other end connected to ground GND. The power supply 100 may supply direct current (DC) power or alternating current (AC) power to the inverter 200. In case that the power supply 100 supplies the AC power to the inverter 200, the inverter 200 may include a rectifying circuit (not shown) at its input stage to convert the AC power to the DC power.

The inverter 200 includes a plurality of switching devices, i.e. a first through sixth switching devices 210-260. The first through sixth switching devices 210-260 in the inverter 200 is connected to a three phase bridge form. In detail, the first and second switching devices 210 and 220 are connected in series between the DC power supply and the ground. A node between the first and second switching devices 210 and 220 provides the motor 30 with a U-phase motor drive signal. The third and fourth switching devices 230 and 240 are connected in series between the DC power supply and the ground. A node between the third and fourth switching devices 230 and 240 provides the motor 30 with a V-phase motor drive signal. The fifth and sixth switching devices 250 and 260 are connected in series between the DC power supply and the ground. A node between the fifth and sixth switching devices 250 and 260 provides the motor 30 with a W-phase motor drive signal. Each of the switching devices 210-260 includes a metal-oxide-semiconductor field effect transistor (MOSFET) switch S1-S6 and a free-wheeling diode, and are turned on or off in response to switching control signals from the PWM circuit 300 to output the U-phase, V-phase, and W-phase motor drive signals. The U-phase, V-phase, and W-phase motor drive signals are phase voltages applied to respective windings in the motor 30.

The PWM circuit 300 generates a PWM signal to which a duty ratio determined by the controller 500 is applied to control a rotation speed of a rotor in the motor 30. Also, the PWM circuit 300 generates a drive signal, based on the PWM signal, for inducing phase changes in the motor 30. Further, the PWM circuit 300 receives phase change timing information from the controller 500 and generates the switching control signals by changing phase of the drive signal according to the phase change timing information and amplifying phase-changed drive signal. Here, the phase change timing information may be a rectangular wave or a pulse indicating the phase change timing, but the present disclosure is not limited thereto. For example, in case that the switching device in the inverter 200 is implemented by a n-channel MOSFET as shown in the figure, the switching device is turned while the switching control signal has a high level. Accordingly, the inverter generates the U-phase, V-phase, and W-phase motor drive signals in response to the switching control signals, so that the phase changes can occur at precise timings in the motor 30.

The position detector 400 detects a position of the rotor of the motor 30. According to the present disclosure, the position detector 400 can detect a counter electromotive force generated in the motor 30. For example, in case that a pair of phases sequentially selected among the three phases are provided with the phase voltages, the position detector 400 may detect the counter electromotive force induced in the phase winding which is not provided with the phase voltage. Further, the position detector 400 can detect a zero crossing point of the counter electromotive force.

The controller 500 estimates a phase change timing of the motor 30 based on a time interval between a current zero crossing point and a previous zero crossing point of a same state as the current zero crossing point among the plurality of zero crossing points detected by the position detector 400 to control the motor 30 according to the estimated phase change timing information.

That is, the controller 500 can determine whether the current zero crossing point is located in a rising state or a falling state of a counter electromotive force waveform detected by from the position detector 400, and estimate the phase change timing based on the time interval between the current zero crossing point and the previous zero crossing point of the same state.

On the other hand, in consideration of inductances of the windings and the counter electromotive force induced in the motor 30, it is preferable to change phases of three-phase the motor drive signals before the estimated phase change timing in order to generate a large output torque for a given input power and improve an efficiency of the motor 30. The phase difference between the phase change timing and the phase change timing of each motor drive signal is referred to as a leading angle. In particular, the introduction of the lead angle is required for a uniform generation of the zero crossing and minimization of current ripples and torque ripples. which is described below in detail. The controller 500 may determine the lead angle and drive the motor 30 by reflecting the lead angle to the estimated phase change timing information.

The operation of the controller 500 will now be described in more detail by comparing exemplary embodiments of the present disclosure with comparative examples.

Figure 3:
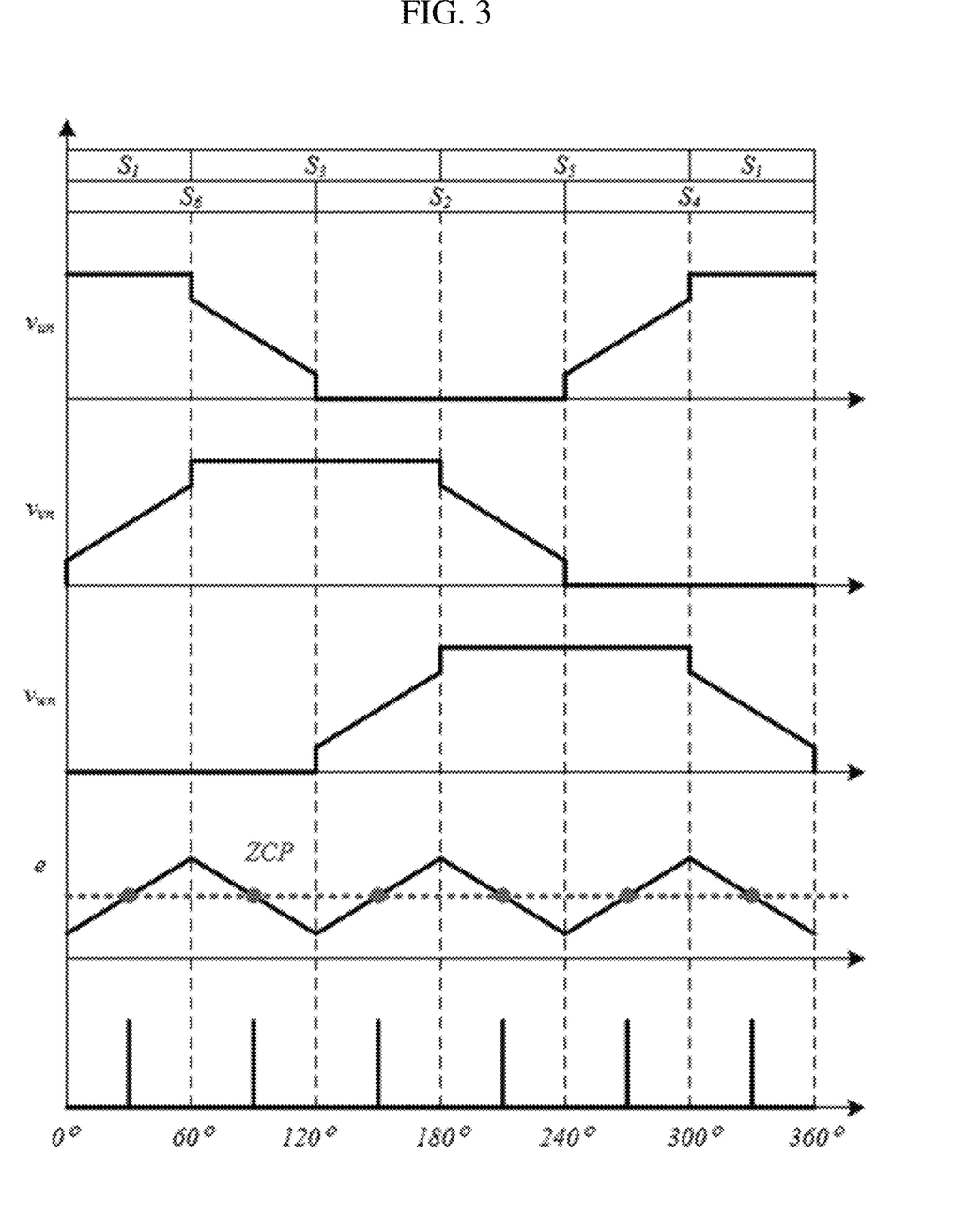
FIG. 3 is a graph illustrating an ideal zero crossing detection signal waveform.

FIG. 3 is a graph illustrating an ideal zero crossing detection signal waveform.

It is assumed that a pair of phases sequentially selected among the three phases are provided with the phase voltages in the inductor 200 as mentioned above. For example, it is assumed that, in a first one sixth of a cycle, the MOSFET switches S1 and S6 are turned on and the remaining switches S2-S5 are turned off so that the U-phase motor control signal is at the high level and the W-phase motor control signal is at the low level and a phase current flows through the U-phase and W-phase windings. At this sub-cycle, the counter electromotive force can be detected in the V-phase winding where the phase voltage is not applied. In a next one sixth of the cycle, it is assumed that the MOSFET switches S3 and S6 are turned on and the remaining switches S1. S2, S4, and S5 are turned off so that the V-phase motor control signal is at the high level and the W-phase motor control signal is at the low level and the phase current flows through the V-phase and W-phase windings. At this sub-cycle, the counter electromotive force can be detected in the U-phase winding where the phase voltage is not applied. In this manner, the counter electromotive force can be detected for the other sub-cycles also.

The controller 500 may combine the counter electromotive forces detected for each phase to construct a counter electromotive force signal, and detect the zero crossing points (ZCPs) in the counter electromotive force signal. The controller 500 may estimate a next phase change timing on the basis of the zero crossing points. The controller 500 may reflect the lead angle in the estimation of the a next phase change timing. The controller 500 provides the phase change timing information to the PWM circuit 300, so that the PWM circuit 300 generates the switching control signals based on the phase change timing information. In this case, the current ripple and the torque ripple can be minimized. Ideally, the zero crossing points are detected at uniform intervals as shown in FIG. 3, and the current ripples and the torque ripples are minimized.

Figure 4:
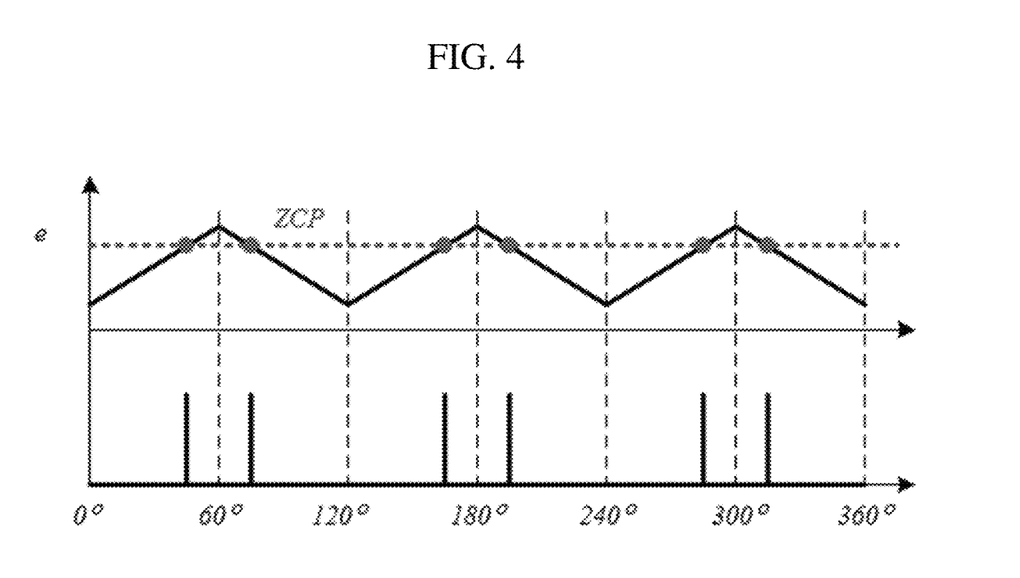
FIG. 4 is a graph illustrating an imbalanced zero crossing detection signal waveform.

FIG. 4 is a graph illustrating an imbalanced zero crossing detection signal waveform.

Unlike the ideal case shown in FIG. 3, the zero crossing points can be detected non-uniformly as shown in FIG. 4 due to a circuit offset, an asymmetrical counter electromotive force, or a fluctuation in the magnetic field while the motor is driven. Such non-uniform zero crossing points increase the current ripples and the torque ripples and lowers the control stability, which may result in an out-of-phase operation during a high speed operation or when the load fluctuates.

Figure 5:
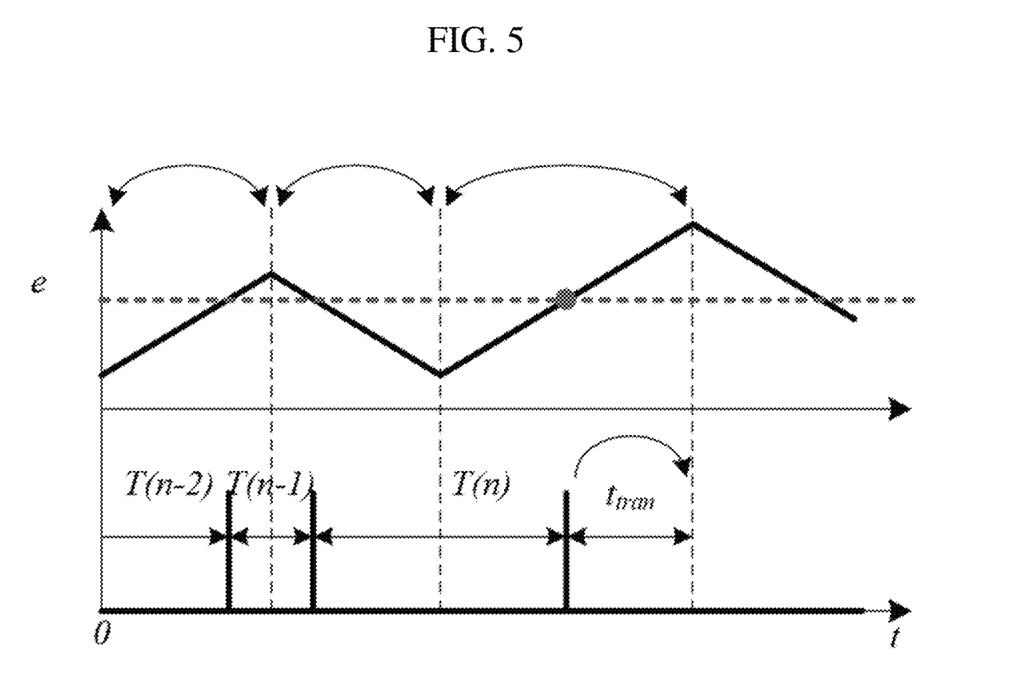
FIG. 5 is a graph for explaining an estimation of a phase change timing using a zero crossing point according to a comparative example.

FIG. 5 is a graph for explaining the estimation of the phase change timing using the zero crossing point according to a comparative example.

In the comparative example shown in FIG. 5, since a time interval between a current zero crossing point T0 and a previous zero crossing point T1 is T(n), the next phase change timing with respect to the current zero crossing point T0 can be estimated by equation 1 assuming that the counter electromotive force signal varies symmetrically with respect to an average of its maximum and minimum values.

$$t_{trans} = \frac{T(n)}{2} \quad (1)$$

However, when the motor drive signals are generated and applied to the motor 30 according to the estimated phase change timing as in the comparative example, the actual phase change may occur differently from the estimated phase change timing as shown in FIG. 5.

Figure 6:
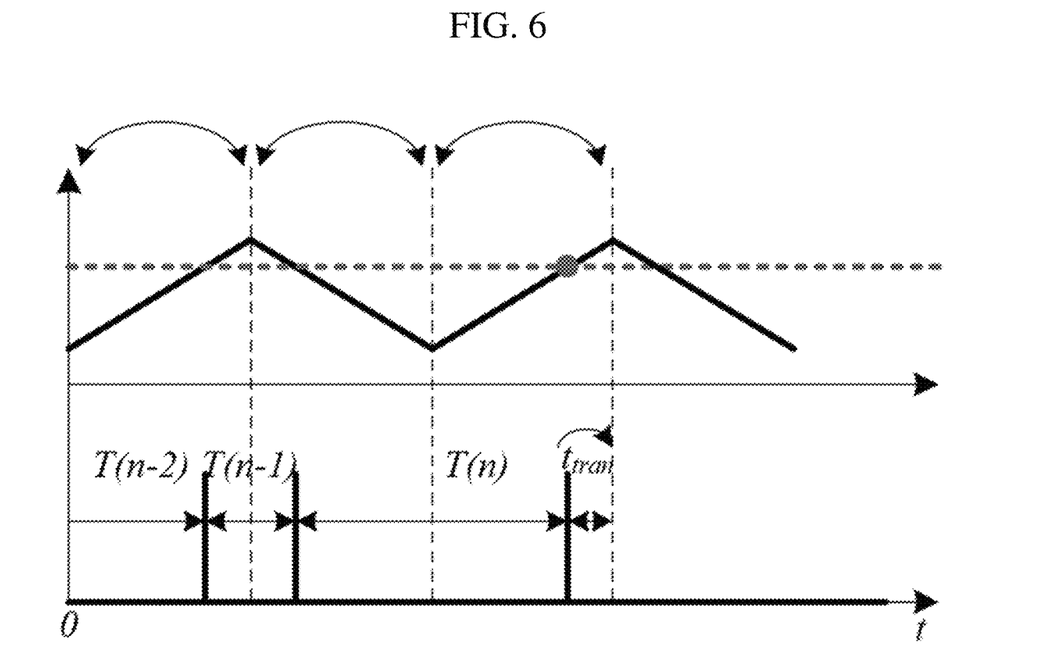
FIG. 6 is a graph for explaining an estimation of a phase change timing using a zero crossing point according to an exemplary embodiment of the present disclosure.

FIG. 6 is a graph for explaining an estimation of the phase change timing using the zero crossing point according to an exemplary embodiment of the present disclosure.

Referring to FIG. 6, the state of the counter electromotive force signal at the current zero crossing point T0 recently detected from the counter electromotive force signal is discriminated in the present embodiment. Here, the 'state' means whether the zero crossing point is located in the rising edge or in the falling edge of the counter electromotive force signal.

The phase change timing is estimated, by equation 2, based on a time interval T(n–1) between a previous zero crossing point T2 having the same state as the current zero crossing point T0 and a next zero crossing point T1 of the previous zero crossing point T2.

$$t_{trans} = \frac{T(n-1)}{2} \quad (2)$$

As a result, the phase change points can occur at uniform intervals as shown in FIG. 6.

On the other hand, the phase change timing estimated according to the exemplary embodiment of the present disclosure assumes that the lead angle is zero. If, however, a lead angle control is to be introduced, a leading angle time should be taken into account additionally.

Figure 7:
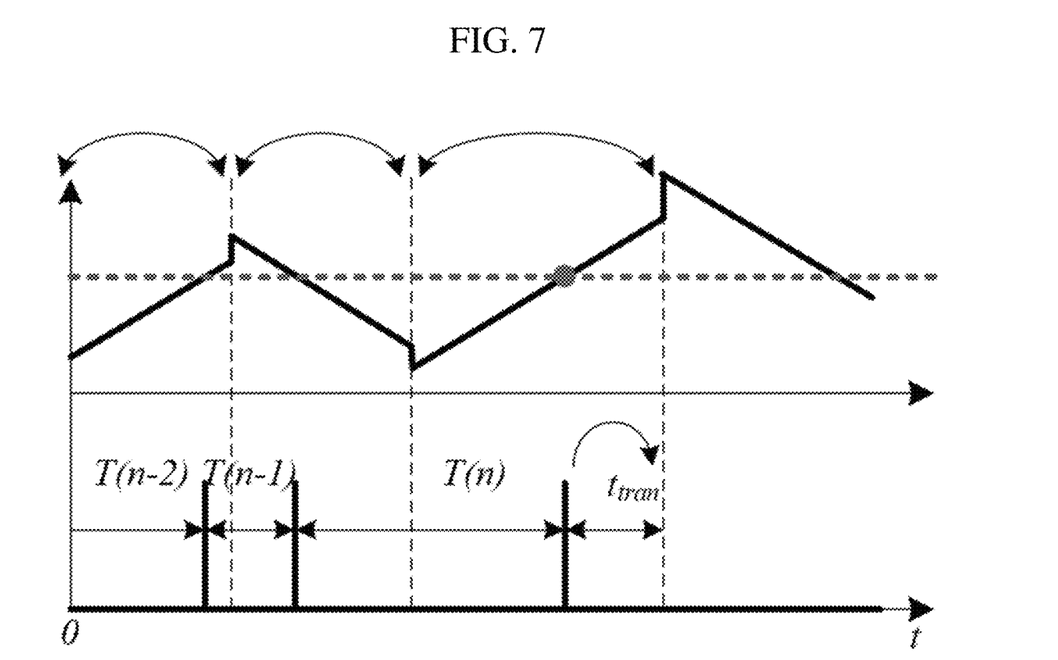
FIG. 7 is a graph for explaining an estimation of a lead angle according to a comparative example.

FIG. 7 is a graph for explaining an estimation of the lead angle according to a comparative example.

Assuming that the lead angle to be introduced is x degrees, the lead angle time can be calculated by equation 3 based on the zero crossing time interval T(n) in the comparative example.

$$t_{adv} = \frac{x°}{60°} T(n) \tag{3}$$

However, if the lead angle time is calculated as above on the assumption of detecting the ideal zero crossing point in the comparative example, the phase change timing may be estimated incorrectly when the zero crossing points are detected non-uniformly as shown in FIG. 7.

Figure 8:
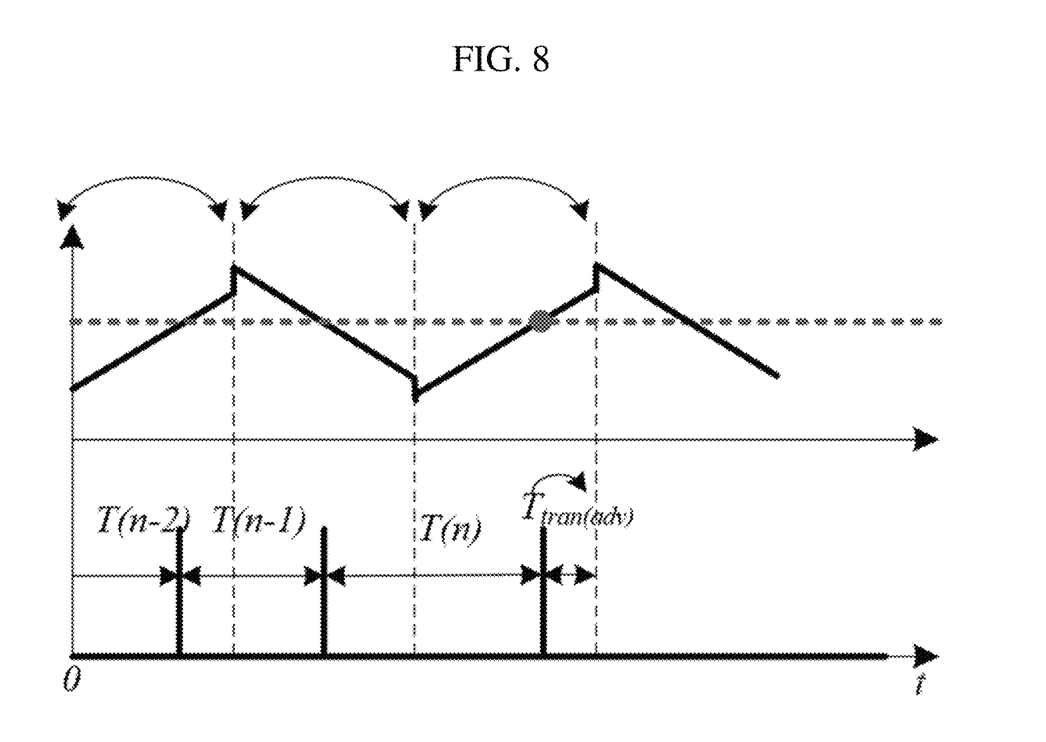
FIG. 8 is a graph for explaining an estimation of a lead angle and the phase change timing according to an exemplary embodiment of the present disclosure.

FIG. 8 is a graph for explaining the estimation of the lead angle and the phase change timing according to an exemplary embodiment of the present disclosure.

According to the exemplary embodiment of the present disclosure, the lead angle time is calculated by equation 4 fully taking into account the state of the counter electromotive force signal at the zero crossing points.

$$t_{adv} = \frac{x°}{120°} \{T(n) + T(n-1)\} \tag{4}$$

The next phase change timing can be calculated by equation 5 reflecting the lead angle of x degrees, so that phase change can occur uniformly as shown in FIG. 8.

$$t_{trans(adv)} = \frac{T(n-1)}{2} + \frac{x°}{120°}\{T(n) + T(n-1)\} \tag{5}$$

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made therein without departing from the spirit and scope as defined by the following claims. Meanwhile, specific terms in this specification and the drawings are used in a generic sense only to facilitate the description and understanding of the present disclosure, and are not intended to limit the scope of the disclosure.

What is claimed is:

1. A motor drive device, comprising:
a position detector configured to detect a rotational position of a rotor of a motor by detecting a plurality of zero crossing points of a counter electromotive force induced in the motor; and
a controller configured to control the motor by estimating a phase change timing based on a time interval between a current zero crossing point and a previous zero crossing point of a same state as the current zero crossing point among the plurality of zero crossing points detected by the position detector,
wherein the controller is configured to:
determine a rising or falling state of the counter electromotive force at an instant at which the current zero crossing point T0 is detected, and
estimate the phase change timing based on the time interval between the current zero crossing point and the previous zero crossing point of the same state as the current zero crossing point.

2. The motor drive device of claim 1, wherein the controller estimates the phase change timing according to equation 2:

$$t_{trans} = \frac{T(n-1)}{2} \tag{2}$$

where T(n−1) denotes a time interval between the previous zero crossing point T2 having a same rising and falling state as the current zero crossing point T0 detected recently and the next zero crossing point T1 of the previous zero crossing point T2.

3. The motor drive device of claim 2, wherein the controller determines a lead angle from a waveform of the counter electromotive force detected by the position detector and estimates the phase change timing by additionally taking into account the lead angle.

4. The motor drive device of claim 3, wherein the controller calculates a lead angle time according to equation 4:

$$t_{adv} = \frac{x°}{120°}\{T(n) + T(n-1)\} \tag{4}$$

where x denotes the lead angle, and T(n) denotes a time interval between the current zero crossing point T0 and a prior previous zero crossing point T1 occurred just before.

5. The motor drive device of claim 4, wherein the controller estimates the phase change timing by taking into account the lead angle according to equation 5:

$$t_{trans(adv)} = \frac{T(n-1)}{2} + \frac{x°}{120°}\{T(n) + T(n-1)\} \tag{5}$$

6. A motor drive system, comprising:
a motor configured to generate a torque and comprising a rotor;
a position detector configured to detect a rotational position of the rotor of the motor by detecting a plurality of zero crossing points of a counter electromotive force induced in the motor; and
a controller configured to control the motor by estimating a phase change timing based on a time interval between a current zero crossing point and a previous zero crossing point of a same state as the current zero crossing point among the plurality of zero crossing points detected by the position detector,
wherein the controller is configured to:
determine a rising or falling state of the counter electromotive force at an instant at which the current zero crossing point T0 is detected, and estimate the phase change timing based on the time interval between the current zero crossing point and the previous zero crossing point of the same state as the current zero crossing point.

\* \* \* \* \*